US007432922B2

(12) United States Patent
Chang et al.

(10) Patent No.: US 7,432,922 B2
(45) Date of Patent: Oct. 7, 2008

(54) SOURCE DRIVER AND SOURCE DRIVING METHOD

(75) Inventors: Yaw Guang Chang, Hsinhua (TW); Ming Cheng Chiu, Hsinhua (TW)

(73) Assignee: Himax Technologies, Inc., Tainan County (TW)

( * ) Notice: Subject to any disclaimer, the term of this patent is extended or adjusted under 35 U.S.C. 154(b) by 550 days.

(21) Appl. No.: 11/082,737

(22) Filed: Mar. 18, 2005

(65) Prior Publication Data

US 2006/0164374 A1 Jul. 27, 2006

(30) Foreign Application Priority Data

Jan. 24, 2005 (TW) .............................. 94102051 A

(51) Int. Cl.
*G06F 3/038* (2006.01)
*G09G 3/36* (2006.01)

(52) U.S. Cl. ......................... 345/212; 345/98; 345/100; 330/54; 330/255

(58) Field of Classification Search .................. 345/87, 345/92–95, 98–100, 211–214; 365/203, 365/204; 330/9, 53, 54, 255
See application file for complete search history.

(56) References Cited

U.S. PATENT DOCUMENTS

| | | | | |
|---|---|---|---|---|
| 6,081,131 | A * | 6/2000 | Ishii | 326/68 |
| 6,323,847 | B1 * | 11/2001 | Kaneko et al. | 345/204 |
| 6,567,327 | B2 | 5/2003 | Tsuchi | |
| 7,068,098 | B1 * | 6/2006 | Bell et al. | 330/75 |

* cited by examiner

*Primary Examiner*—Henry N Tran
(74) *Attorney, Agent, or Firm*—Smith, Gambrell & Russell, LLP

(57) ABSTRACT

A source driver for LCD devices, used for driving at least one data line, comprises an input for receiving a predetermined voltage; an output electrically being connected to the data line and having an output voltage; a voltage clamping circuit for clamping the output voltage within a predetermined voltage range; a first differential amplifier for increasing the clamped output voltage toward the predetermined voltage; and a second differential amplifier for decreasing the clamped output voltage toward the predetermined voltage. The present invention also provides a source driving method for LCD devices.

25 Claims, 9 Drawing Sheets

| | t0 to t1 | t1 to t2 | t2 to t3 | t3 to t4 |
|---|---|---|---|---|
| switch S1,S3 | OFF | ON | OFF | OFF |
| switch S2,S4 | OFF | OFF | ON | OFF |
| switch S5,S7 | OFF | ON | OFF | OFF |
| switch S6,S8 | OFF | OFF | ON | OFF |
| switch S9,S10 | OFF | OFF | OFF | ON |
| switch S11,S12 | ON | OFF | OFF | OFF |

SOURCE DRIVER AND SOURCE DRIVING METHOD

CROSS REFERENCE TO RELATED APPLICATION

This application claims the priority benefit of Taiwan Patent Application Serial Number 094102051, filed on Jan. 24, 2005, the full disclosure of which is incorporated herein by reference.

BACKGROUND OF THE INVENTION

1. Field of the Invention

This invention generally relates to a source driver and a source driving method, and more particularly to a source driver and source driving method for LCDs.

2. Description of the Related Art

FIG. 1 is a conventional driving circuit for an active matrix LCD (liquid crystal display) device 100. The LCD device 100 includes an LCD panel 110 having a TFT (thin film transistor) array 112 disposed thereon, a gate driving circuit 120 and a source driving circuit 130. The TFT array 112 is formed by a plurality of thin film transistors 113. Each transistor 113 has its gate 113*a* connected to a corresponding scanning line 114, its source 113*b* connected to a corresponding data line 116, and its drain 113*c* connected to one terminal of a corresponding display capacitor 118. The other terminal of the display capacitor 118 is connected to a common voltage VCOM. The gate driving circuit 120 is used for providing switching signals (i.e. scanning signals) to the scanning lines 114, and the source driving circuit 130 is used for providing level voltages to the data lines 116.

FIG. 2 is a schematic diagram of a typical source driving circuit 130 for the active matrix LCD device 100. The source driving circuit 130 comprises a voltage divider 200, a plurality of decoders 202 and a plurality of drivers 204. The voltage divider 200 is composed of resistors R1 to Rn and used for generating multiple level voltages. The level voltages generated from the voltage divider 200 are selected by switching the switches 202*a* in the decoder 202 and outputted to the inputs 204*a* of the drivers 204. Each driver 204 is respectively corresponding to each data line 116 of the LCD panel 110 (shown in FIG. 1), and connected to and drives each data line 116 through the output 204*b*.

FIG. 3 is a schematic circuit of a driver 204 disclosed in U.S. Pat. No. 6,567,327 B2. The driver 204 comprises a pull-high differential amplifier 210, a pull-low differential amplifier 212. The driver 204 has an input 204*a* for receiving a level voltage Vin and an output 204*b*. The output voltage Vout of the driver 204 is fed back (negative feedback) to the inputs Vin− (i.e. inverting inputs) of the differential amplifiers 210, 212, and the level voltage Vin is inputted to the inputs Vin+ (non-inverting inputs) of the same.

The pull-high differential amplifier 210 is operated just while the output voltage Vout is smaller than the voltage at the input Vin+, whereby increasing the output voltage Vout toward the voltage at the input Vin+. In addition, the pull-low differential amplifier 212 is operated just while the output voltage Vout is larger than the voltage at the input Vin+, whereby decreasing the output voltage Vout toward the voltage at the input Vin+.

The operation of the driver 204 is described below. The output voltage Vout is stable while the voltage at the input Vin+ equal to that at the input Vin−. When the voltage at the input Vin+ is changed and larger than that at the input Vin−, that is, when the level voltage Vin is larger than the output voltage Vout, only switches S1, S2, S3 are turned on such that the transistor 220 is turned on by an output voltage V01; then, the output voltage Vout begins increasing toward the voltage at the input Vin+; finally, only switch S0 is turned on such that the input 204*a* is short to the output 204*b* whereby more precisely pulling the voltage level of the output voltage Vout to that of the level voltage Vin. In addition, When the voltage at the input Vin+is changed and smaller than that at the input Vin−, that is, when the level voltage Vin is smaller than the output voltage Vout, only switches S4, S5, S6 are turned on such that the transistor 222 is turned on by an output voltage V02; then, the output voltage Vout begins decreasing toward the voltage at the input Vin+; finally, only switch S0 is turned on such that the input 204*a* is short to the output 204*b* whereby more precisely pulling the voltage level of the output voltage Vout to that of the level voltage Vin.

However, when the voltage level of the output voltage Vout is close to the voltage level of a high supply voltage VDD and smaller than that of the level voltage Vin, it is difficult for the pull-high differential amplifier 210 to pull up the output voltage Vout. In addition, when the voltage level of the output voltage Vout is close to the voltage level of a low supply voltage VSS and larger than that of the level voltage Vin, it is difficult for the pull-low differential amplifier 212 to pull down the output voltage Vout. Therefore, the output voltage Vout of the driver 204 is limited and cannot cover the whole voltage range between VSS and VDD.

Accordingly, the present invention provides a source driver for LCDs having a wide driving voltage range so as to solve the above-mentioned problem existing in the art.

SUMMARY OF THE INVENTION

It is an object of the present invention to provide a source driver for LCDs, which can increase the driving voltage range and decrease the power consumption.

It is another object of the present invention to provide a source driver for LCDs, which can reduce the circuit size and the manufacturing cost of a source driving circuit.

In order to achieve the above object, the source driver for LCD devices, used for driving at least one data line, comprises an input for receiving a predetermined voltage; an output electrically being connected to the data line and having an output voltage; a voltage clamping circuit for clamping the output voltage within a predetermined voltage range; a first differential amplifier for increasing the clamped output voltage toward the predetermined voltage; and a second differential amplifier for decreasing the clamped output voltage toward the predetermined voltage.

The source driver according to the present invention further comprises a first switching circuit and a second switching circuit respectively used for alternatively switching a plurality of predetermined voltages and alternatively switching a plurality of output voltage of a plurality of data lines to the first and second differential amplifiers during a scanning line period, such that the plurality of output voltages at the plurality of data lines can be respectively driven through the first and second differential amplifiers according to the plurality of predetermined voltages. More specifically, since the plurality of data lines can share the first and second differential amplifiers, the circuit size and the manufacturing cost of a source driving circuit can be reduced.

The present invention also provides a source driving method, applied to a source driver, for driving a plurality of data lines each having an output voltage, wherein the source driver includes a first differential amplifier for increasing the output voltage and a second differential amplifier for decreasing the output voltage. The source driving method comprises following steps: clamping the output voltage of each data line within a voltage range between a first voltage and a second voltage such that the output voltage is larger than the first voltage and smaller than the second voltage; and within a predetermined period, alternatively receiving the output voltages of the data lines and a plurality of predetermined voltages through the first and second differential amplifiers whereby respectively pulling the output voltage of each data line toward each predetermined voltage through the first and second differential amplifiers. The source driving method according to the present invention further comprises a step of receiving each predetermined voltage respectively through each data line such that the output voltage of each data line is substantially equal to each predetermined voltage.

According to the source driving method of the present invention, the two differential amplifiers can drive multiple data lines; therefore, the number of differential amplifiers used for driving data lines can be decreased whereby reducing the circuit size and the manufacturing cost of a source driving circuit.

BRIEF DESCRIPTION OF THE DRAWINGS

Other objects, advantages, and novel features of the present invention will become more apparent from the following detailed description when taken in conjunction with the accompanying drawings.

DETAILED DESCRIPTION OF THE PREFERRED EMBODIMENT

Figure 1:
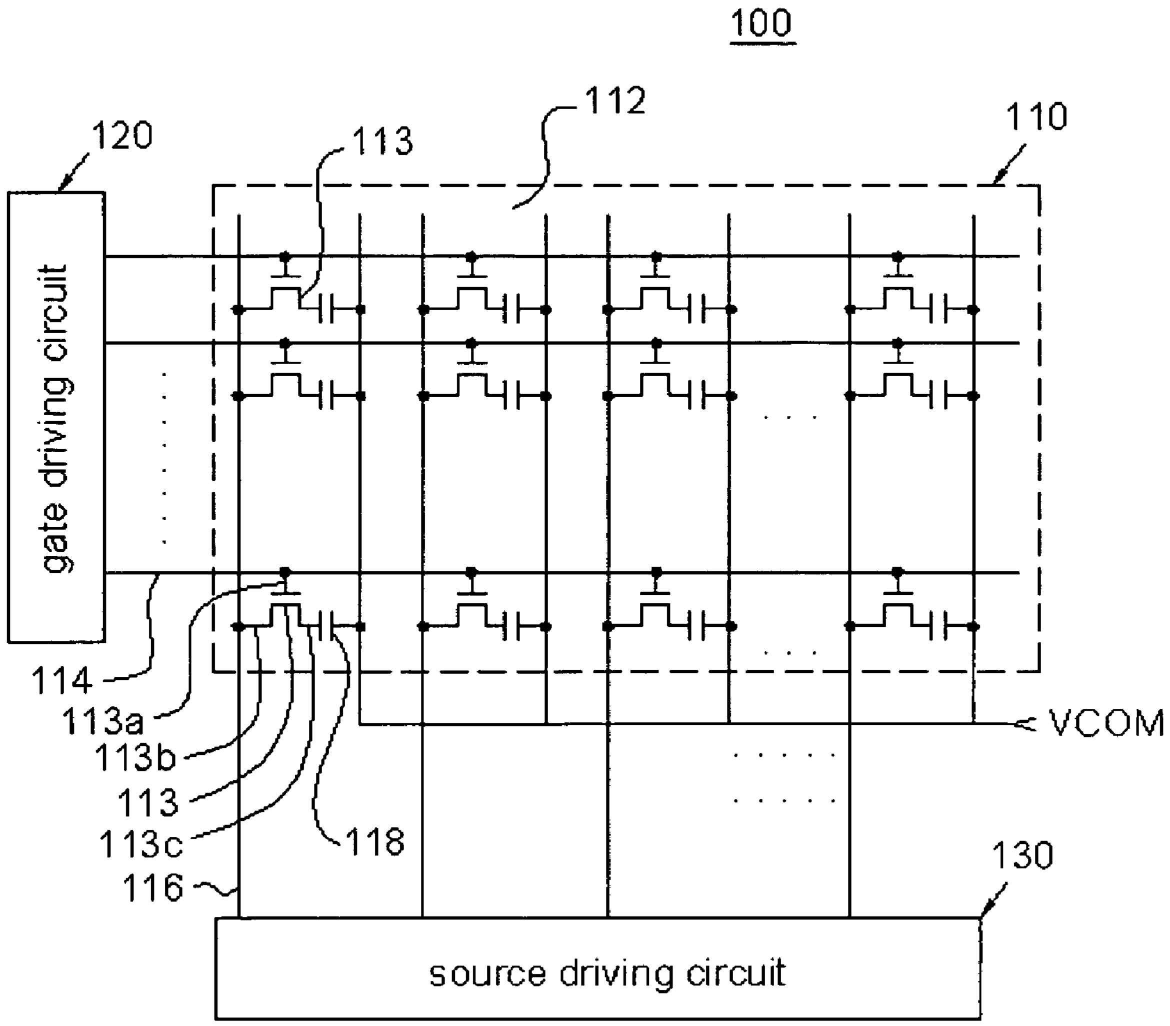
FIG. 1 (PRIOR ART)
FIG. 1 is a conventional driving circuit for an active matrix LCD (liquid crystal display) device.
Figure 2:
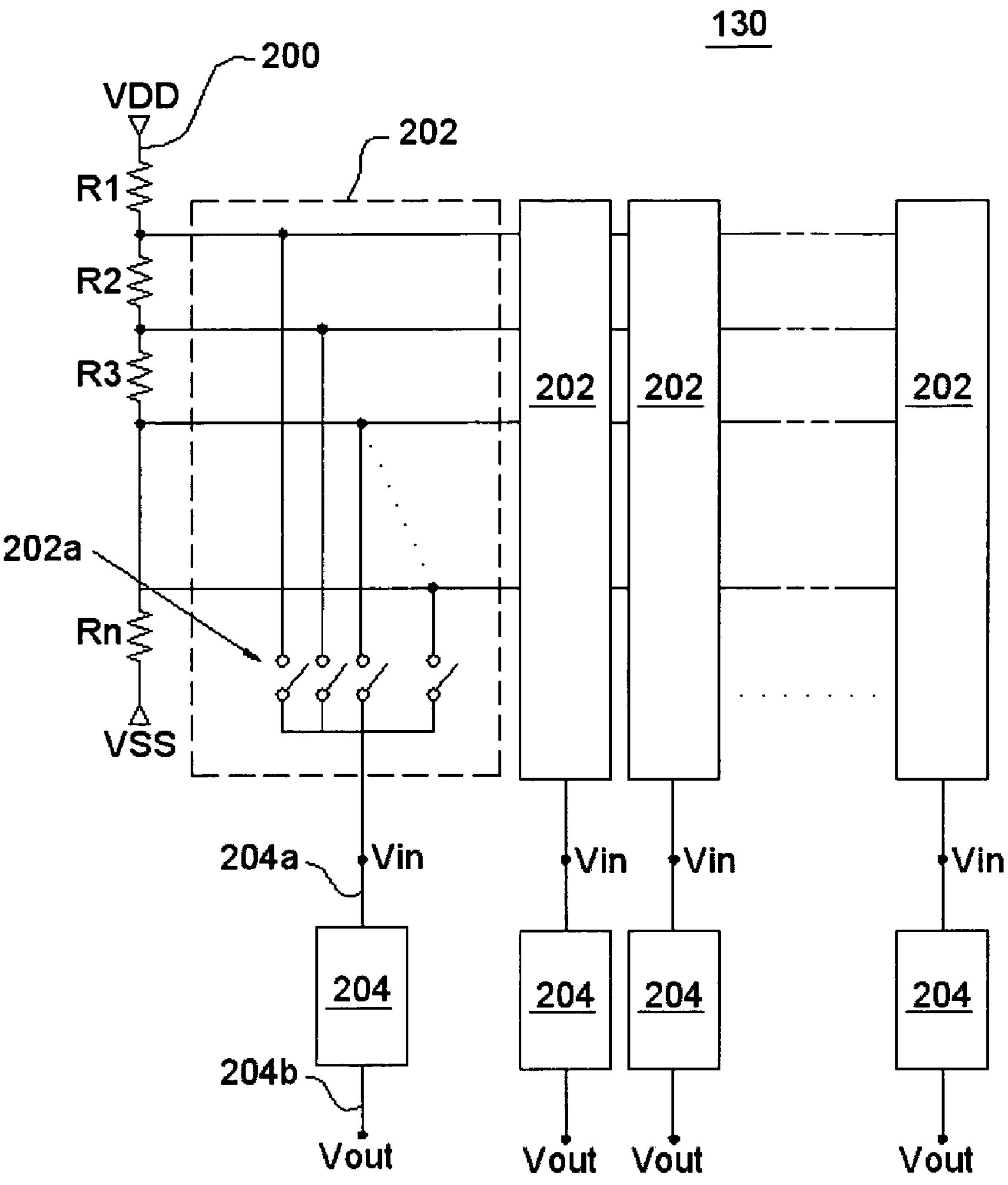
FIG. 2 (PRIOR ART)
FIG. 2 is a schematic diagram of a typical source driving circuit for the active matrix LCD device shown in FIG. 1.
Figure 3:
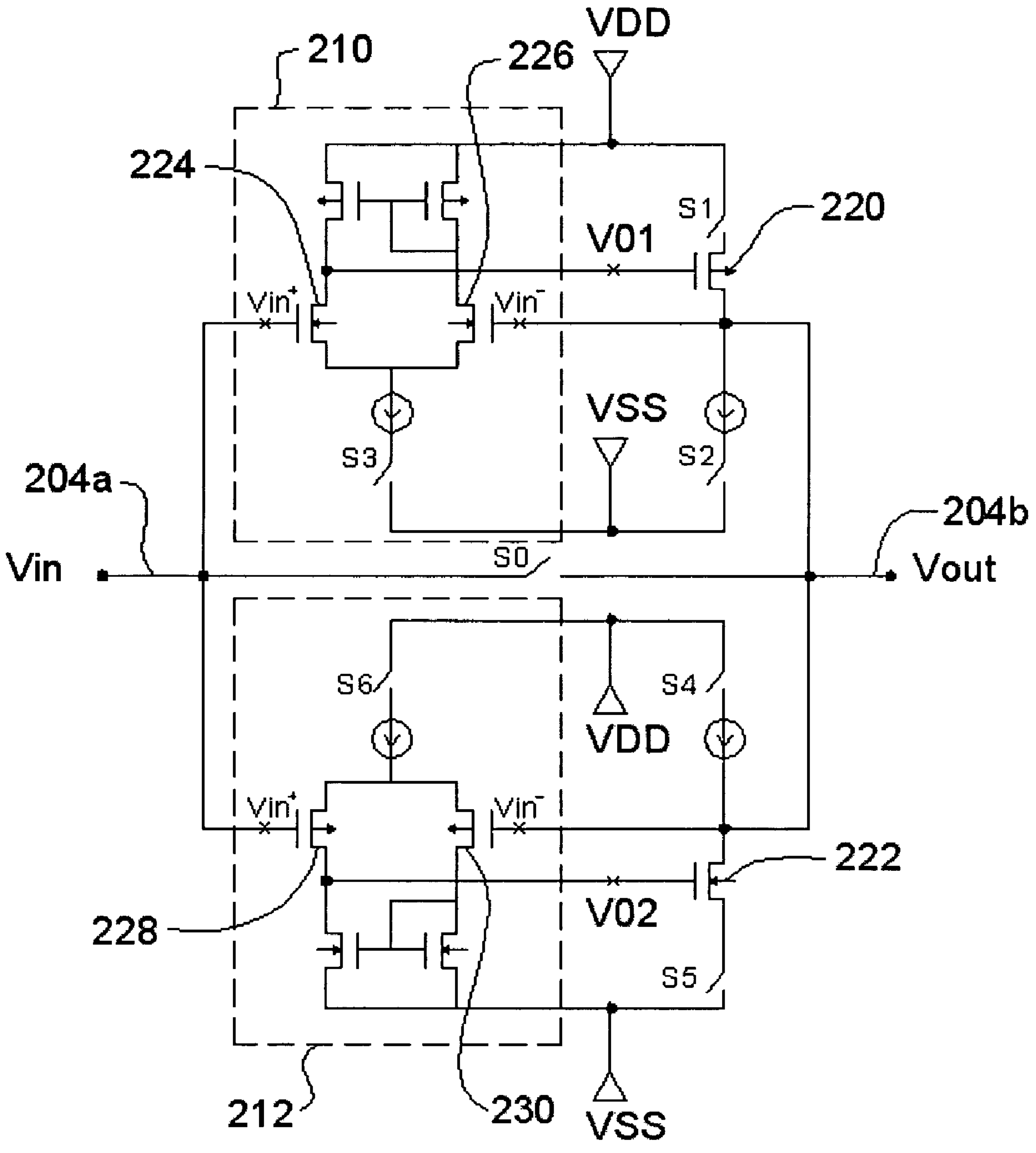
FIG. 3 (PRIOR ART)
FIG. 3 is a schematic circuit of a conventional driver.
Figure 4:
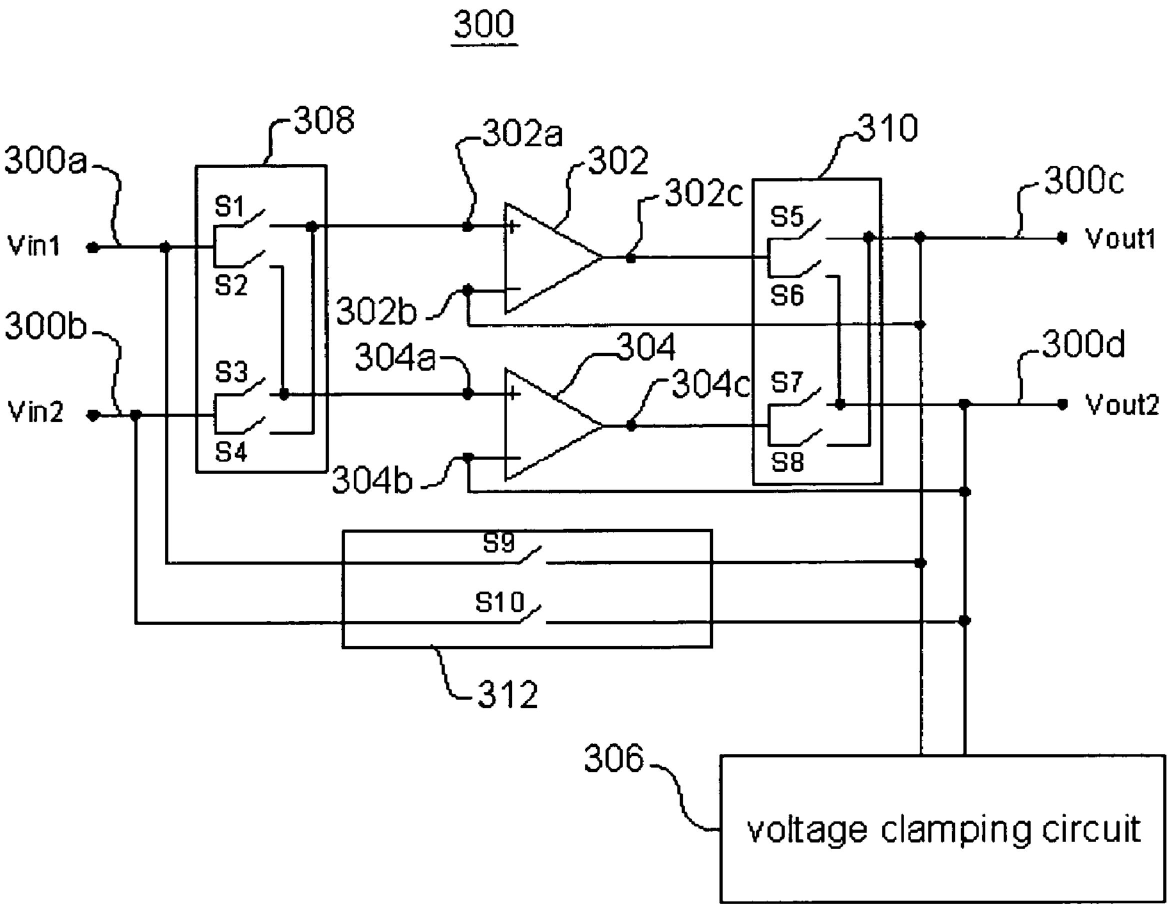
FIG. 4 is a circuit diagram of a source driver for LCDs according to one embodiment of the present invention.

FIG. 4 is a circuit diagram of a source driver 300 for LCDs according to one embodiment of the present invention. The source driver 300 has two inputs 300*a* and 300*b* for respectively receiving level voltages Vin1 and Vin2 from a voltage divider (e.g. the voltage divider 200 shown in FIG. 2), and two outputs 300*c* and 300*d* for respectively and electrically being connected to two data lines disposed on an LCD panel (e.g. the data lines 116 shown in FIG. 1), wherein the outputs 300*c* and 300*d* respectively have output voltages Vout1 and Vout2. The source driver 300 includes a pull-high differential amplifier 302, a pull-low differential amplifier 304, a voltage clamping circuit 306, a first switching circuit 308, a second switching circuit 310 and a third switching circuit 312. The first switching circuit 308 has switches S1, S2, S3 and S4; the second switching circuit 310 has switches S5, S6, S7 and S8; and the third switching circuit 312 has switches S9 and S10.

The source driver 300 is used for driving two data lines during a scanning line period, that is, for respectively pulling the voltage levels of the output voltages Vout1, Vout2 at the outputs 300*c*, 300*d* to those of the level voltages Vin1, Vin2 at the inputs 300*a*, 300*b* during a scanning line period. The term “a scanning line period” herein means the time period that one scanning line is selected or activated to turn on one row of transistors on an LCD panel.

In source driver 300, the pull-high differential amplifier 302 has a non-inverting input 302*a*, an inverting input 302*b* and an output 302*c*. The output 302*c* is connected to the inverting input 302*b* (negative feedback structure). The pull-low differential amplifier 304 has a non-inverting input 304*a*, an inverting input 304*b* and an output 304*c*. The output 304*c* is connected to the inverting input 304*b* (negative feedback structure).

The voltage clamping circuit 306 is used for clamping the output voltages Vout1, Vout2 of the outputs 300*c*, 300*d* within a voltage range between a first voltage VA and a second voltage VB.

The switches S1, S2, S3 and S4 of the first switching circuit 308 are used for alternatively and electrically connecting the level voltages Vin1, Vin2 of the inputs 300*a*, 300*b* with the non-inverting inputs 302*a*, 304*a* of the differential amplifiers 302, 304. The switches S5, S6, S7 and S8 of the second switching circuit 310 are used for alternatively and electrically connecting the outputs 302*c*, 304*c* of the differential amplifiers 302, 304 with the outputs 300*c*, 300*d*. The switches S9 and S10 of the third switching circuit 312 are used for respectively and electrically connecting the inputs 300*a*, 300*b* with the outputs 300*c*, 300*d* such that the output voltages Vout1, Vout2 can be respectively and substantially equal to the level voltages Vin1, Vin2.

Figure 5:
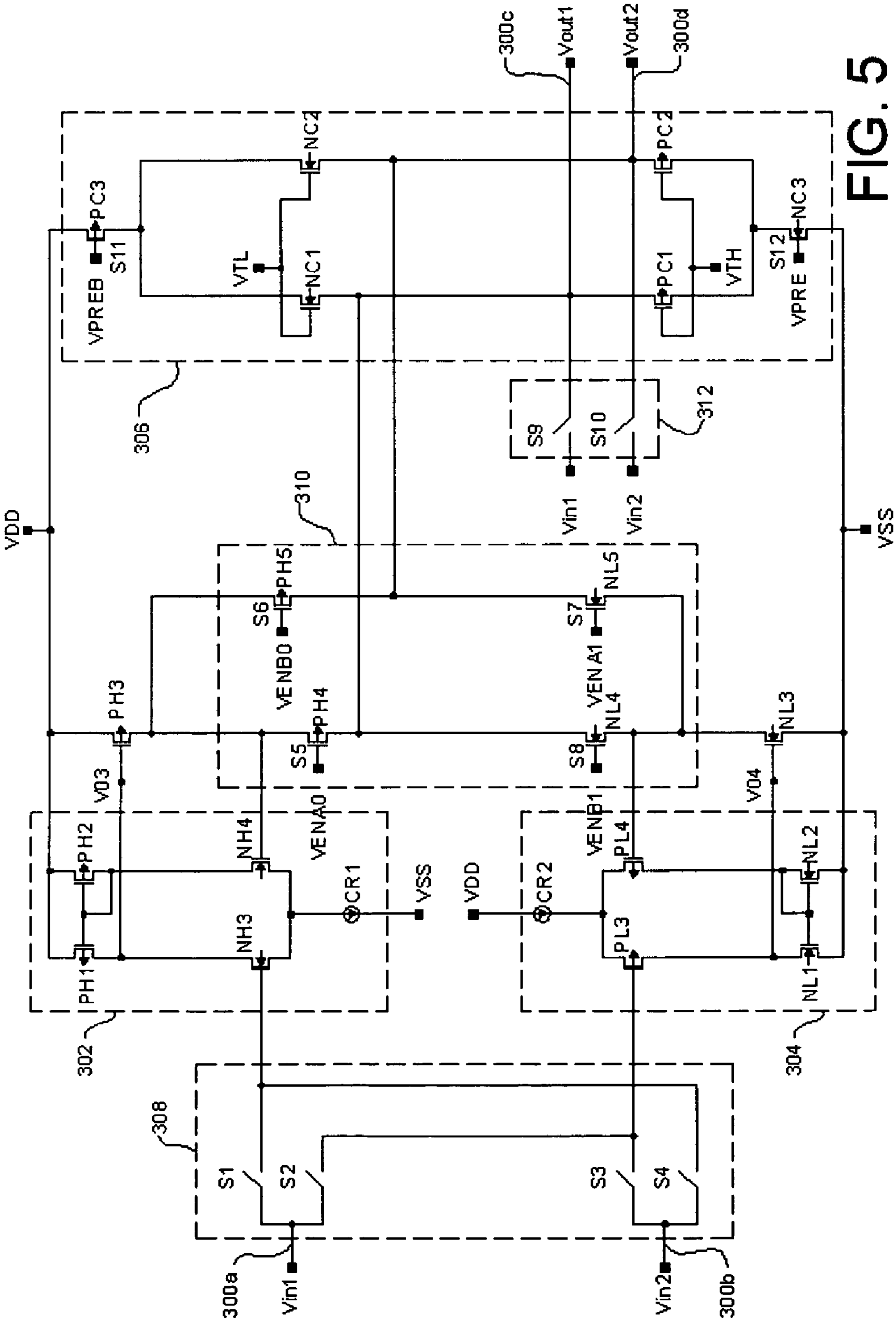
FIG. 5 is a detailed circuit of the source driver for LCDs shown in FIG. 4 according to one embodiment of the present invention.

FIG. 5 is a detailed circuit of the source driver 300 for LCDs shown in FIG. 4 according to one embodiment of the present invention.

In FIG. 5, the source driver 300 comprises a pull-high differential amplifier 302, a pull-low differential amplifier 304, a voltage clamping circuit 306 and several transistors functioning as switches.

The pull-high differential amplifier 302 includes a differential pair of NMOS (N-type metal oxide semiconductor) transistors NH3 and NH4, a current mirror composed of PMOS (P-type metal oxide semiconductor) transistors PH1 and PH2, and a constant current source CR1. The pull-high differential amplifier 302 has its output connected to the gate of a PMOS transistor PH3, which functions as an output stage. The differential pair of NMOS transistors NH3 and NH4 is electrically connected to the current mirror composed of the PMOS transistors PH1 and PH2. More specifically, the transistor PH1 has its drain electrically connected to the drain of the transistor NH3, its source electrically connected to a high supply voltage VDD, and its gate electrically connected to the gate of the transistor PH2; The transistor PH2 has its drain electrically connected to the drain of the transistor NH4, its source electrically connected to the high supply voltage VDD, and its gate electrically connected to its drain.

The gate of the transistor NH3 is connected to the inputs 300*a* and 300*b* respectively through the switches S1 and S4. The transistor NH4 has its gate connected to the drain of the transistor PH3. The sources of the transistors NH3, NH4 are commonly connected to one end of the constant current source CR1, and the other end of the constant current source CR1 is connected to a low supply voltage VSS.

The transistor PH3 functions as charging means and has its source electrically connected to the high supply voltage VDD, its gate electrically connected to the drain of the transistor PH1, and its drain electrically connected to the sources of PMOS transistors PH4 and PH5. The transistors PH4 and PH5 have their drains respectively connected to the outputs 300*c* and 300*d* and their gates respectively connected to controlling voltages VENA0 and VENB0. The transistors PH4 and PH5 can function as the switches S5 and S6 shown in FIG. 4 by the controls of the controlling voltages VENA0 and VENB0 whereby selectively and electrically connecting the output V03 of the pull-high differential amplifier 302 with the outputs 300*c* and 300*d* through the transistor PH3.

The pull-low differential amplifier 304 includes a differential pair of PMOS transistors PL3 and PL4, a current mirror composed of NMOS transistors NL1 and NL2, and a constant current source CR2. The pull-low differential amplifier 304 has its output connected to the gate of a NMOS transistor NL3, which functions as an output stage. The differential pair of PMOS transistors PL3 and PL4 is electrically connected to the current mirror composed of the NMOS transistors NL1 and NL2. More specifically, the transistor NL1 has its drain electrically connected to the drain of the transistor PL3, its source electrically connected to the low supply voltage VSS, and its gate electrically connected to the gate of the transistor NL2; The transistor NL2 has its drain electrically connected to the drain of the transistor PL4, its source electrically connected to the low supply voltage VSS, and its gate electrically connected to its drain.

The gate of the transistor PL3 is connected to the inputs 300*a* and 300*b* respectively through the switches S2 and S3. The transistor PL4 has its gate connected to the drain of the transistor NL3. The sources of the transistors PL3, PL4 are commonly connected to one end of the constant current source CR2, and the other end of the constant current source CR2 is connected to the high supply voltage VDD.

The transistor NL3 functions as discharging means and has its source electrically connected to the low supply voltage VSS, its gate electrically connected to the drain of the transistor NL1, and its drain electrically connected to the sources of NMOS transistors NL4 and NL5. The transistors NL4 and NL5 have their drains respectively connected to the outputs 300*c* and 300*d* and their gates respectively connected to controlling voltages VENB1 and VENA1. The transistors NL4 and NL5 can function as the switches S8 and S7 shown in FIG. 4 by the controls of the controlling voltages VENB1 and VENA1 whereby selectively and electrically connecting the output V04 of the pull-low differential amplifier 304 with the outputs 300*c* and 300*d* through the transistor NL3.

The voltage clamping circuit 306 has a first sub-clamping circuit composed of an NMOS transistor NC1 and a PMOS transistor PC1, and a second sub-clamping circuit composed of an NMOS transistor NC2 and a PMOS transistor PC2. The transistors NC1 and PC1 function as source followers and have their sources commonly connected to the output 300*c*, their gates respectively connected to controlling voltages VTL and VTH, and their drains respectively connected to the drains of a PMOS transistor PC3 (also referred to as switch S11) and an NMOS transistor NC3 (also referred to as switch S12). The first sub-clamping circuit composed of the NMOS transistor NC1 and the PMOS transistor PC1 is used for clamping the output voltage Vout1 of the output 300*c* within a voltage range between a first voltage VA and a second voltage VB such that VA≦Vout1≦VB, wherein both the voltages VA and VB are larger than the low supply voltage VSS and smaller than the high supply voltage VDD. The transistors NC2 and PC2 function as source followers and have their sources commonly connected to the output 300*d*, their gates respectively connected to the controlling voltages VTL and VTH, and their drains respectively connected to the drains of the PMOS transistor PC3 and the NMOS transistor NC3. The second sub-clamping circuit composed of the NMOS transistor NC2 and the PMOS transistor PC2 is used for clamping the output voltage Vout2 of the output 300*d* within the voltage range between the first voltage VA and the second voltage VB such that VA≦Vout2≦VB, wherein both the voltages VA and VB are larger than the low supply voltage VSS and smaller than the high supply voltage VDD. More preferably, the transistors NC1 and NC2 have the same threshold voltage and the transistors PC1 and PC2 have the same threshold voltage.

In order to clamp the output voltages Vout1, Vout2 of the outputs 300*c*, 300*d* between the first voltage VA and the second voltage VB, the controlling voltages VTL and VTH should conform to the following inequalities:

$$VB > VTL - Vthn2 >= VA \quad (1)$$

$$VA < VTH + Vthp2 <= VB \quad (2)$$

wherein Vthn2 is the threshold voltage of the transistors NC1 and NC2, and Vthp2 is the threshold voltage of the transistors PC1 and PC2.

In this embodiment, it is assumed that the threshold voltage Vthn2 of the transistors NC1 and NC2 is equal to the threshold voltage Vthn1 of the transistors NH3 and NH4, and the threshold voltage Vthp2 of the transistors PC 1 and PC2 is equal to the threshold voltage Vthp1 of the transistors PL3 and PL4; the controlling voltage VTL is equal to the sum of the first voltage VA and the threshold voltage Vthn2 (i.e. VTL=VA+Vthn2), and the controlling voltage VTH is equal to the difference of the second voltage VB and the threshold voltage Vthp2 (i.e. VTH=VB−Vthp2). Accordingly, when the output voltages Vout1, Vout2 of the outputs 300*c*, 300*d* are fallen into the voltage range between VDD and VB, the transistors PC1, PC2 are turned on due to the fact that the voltage difference Vsg between the source and the gate is larger than the threshold voltage Vthp2; the transistors PC1, PC2 are turned on such that the output voltages Vout1 and Vout2 are discharged to the voltage VB=VTH+Vthp2 respectively through the path of the transistors PC1, NC3 and the low supply voltage VSS and the path of the transistors PC2, NC3 and the low supply voltage VSS. In addition, when the output voltages Vout1, Vout2 of the outputs 300*c*, 300*d* are fallen into the voltage range between VSS and VA, the transistors NC1, NC2 are turned on due to the fact that the voltage difference Vgs between the gate and the source is larger than the threshold voltage Vthn2; the transistors NC1, NC2 are turned on such that the output voltages Vout1 and Vout2 are charged to the voltage VA=VTL−Vthn2 respectively through the path of the transistors NC1, PC3 and the high supply voltage VDD and the path of the transistors NC2, PC3 and the high supply voltage VDD. Further, when the output voltages Vout1, Vout2 of the outputs 300*c*, 300*d* are fallen into the voltage range between VA and VB, all the transistors PC1, PC2, NC1, NC2 are turned off such that the output voltages Vout1, Vout2 are maintained.

The transistors PC3 and NC3 have their sources respectively connected to the high supply voltage VDD and the low supply voltage VSS, and their gates respectively connected to controlling voltages VPREB and VPRE. The controlling voltages VPREB and VPRE are opposite (inverted) to each other.

The source driver 300 further comprises switches S9, S10 for connecting (shortening) the level voltages Vin1, Vin2 of the inputs 300*a*, 300*b* respectively to the outputs 300*c*, 300*d* whereby directly driving the output voltages Vout1, Vout2 of the outputs 300*c*, 300*d* to the level voltages Vin1, Vin2 respectively.

It should be understood that the pull-high differential amplifier 302 is used for increasing the output voltages Vout1, Vout2 between the voltage VA and the high supply voltage VDD; the pull-low differential amplifier 304 is used for decreasing the output voltages Vout1, Vout2 between the voltage VB and the low supply voltage VSS.

Figures 6A, 6B:
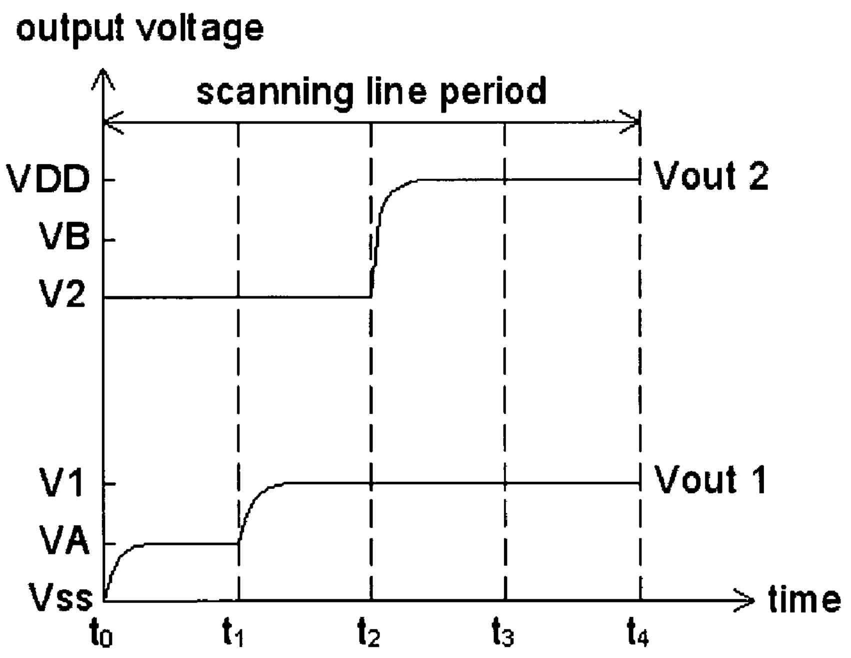
FIGS. 6A, 6B and 6C are two specific examples for illustrating how the source driver of FIG. 5 respectively drive two output voltages to two corresponding level voltages during one scanning time.

FIGS. 6A and 6B present one specific example for illustrating how the source driver of FIG. 5 (also referring to FIG. 4) drive the output voltages Vout1, Vout2 to the level voltages Vin1, Vin2 during one scanning time. FIG. 6A is a table for illustrating the states (i.e. "ON" and "OFF") of the switches S1 to S12 during one scanning time (i.e. t0 to t4). FIG. 6B shows the waveforms of the output voltages Vout1, Vout2 during the scanning time from t0 to t4. In this specific example, it is assumed that the level voltages Vin1, Vin2 received by the inputs 300*a*, 300*b* have the voltage values V1 and VDD respectively, and the output voltages Vout1, Vout2 at the outputs 300*c*, 300*d* have the voltage values VSS and V2 respectively. The following paragraph will illustrate the operation of the source driver 300 for driving the output voltages Vout1 and Vout2 respectively from values VSS and V2 to V1 and VDD.

Firstly, during time t0 to t1, the controlling voltage VPRE presents a high voltage level and the controlling voltage VPREB presents a low voltage level such that the transistors PC3 and NC3 (switches S11 and S12) are respectively turned on and the switches S1 to S10 are turned off; meanwhile, the data clamping circuit 306 is enable so as to clamp the voltage values of the output voltages Vout1, Vout2 within the range between VA and VB. In this period, the data clamping circuit 306 pulls the voltage value of the output voltage Vout1 at output 300*c* from VSS to VA; in addition, the voltage value of the output voltage Vout2 is maintained at V2 since it has been fallen (or clamped) within the range between VA and VB.

Then, during time t1 to t2, switches S1, S3 are turned on while the controlling signals VENA1, VENB0 present a high voltage level and the controlling signals VENA0, VENB1 present a low voltage level, such that the transistors PH4 (switch S5) and NL5 (switch S7) are turned on and the others are turned off. In this period, the data clamping circuit 306 is disable from clamping the voltage voltages Vout1, Vout2, i.e. unclamps the voltage voltages Vout1, Vout2; the transistor NH3 of the pull-high differential amplifier 302 has its gate (non-inverting input) receive the level voltage Vin1 having the value V1 from the input 300*a*, and the transistor NH4 has its gate (inverting input) receive the output voltage Vout having the value VA from the output 300*c*. For the pull-high differential amplifier 302, since the voltage value V1 at the non-inverting input is larger than the voltage value VA at the inverting input, the pull-high differential amplifier 302 can increase the output voltage Vout1 of the output 300*c* from the value VA toward V1 through the transistors PH3, PH4. Meanwhile, the transistor PL3 of the pull-low differential amplifier 304 has its gate (non-inverting input) receive the level voltage Vin2 having the value VDD from the input 300*b*, and the transistor PL4 has its gate (inverting input) receive the output voltage Vout2 having the value V2 from the output 300*d*. For the pull-low differential amplifier 304, since the voltage value VDD at the non-inverting input is larger than the voltage value V2 at the inverting input, the pull-low differential amplifier 304 is not operated such that the voltage value of the output voltage Vout2 at the output 300*d* is maintained at V2.

Then, during time t2 to t3, the switches S2, S4 are turned on while the controlling signals VENA1, VENB0 present a low voltage level and the controlling signals VENA0, VENB1 present a high voltage level, such that the transistors PH5 (switch S6) and NL4 (switch S8) are turned on and the others are turned off. In this period, the transistor NH3 of the pull-high differential amplifier 302 has its gate (non-inverting input) receive the level voltage Vin2 having the value VDD from the input 300*b* and the transistor NH4 has its gate (inverting input) receive the output voltage Vout2 having the value V2 from the output 300*d*. For the pull-high differential amplifier 302, since the voltage value VDD at the non-inverting input is larger than the voltage value V2 at the inverting input, the pull-high differential amplifier 302 can increase the output voltage Vout2 of the output 300*d* from the value V2 toward VDD through the transistors PH3, PH5. Meanwhile, the transistor PL3 of the pull-low differential amplifier 304 has its gate (non-inverting input) receive the level voltage Vin1 having the value V1 from the input 300*a*, and the transistor PL4 has its gate (inverting input) receive the output voltage Vout1 having the value V1 from the output 300*c*. For the pull-low differential amplifier 304, since the voltage value V1 at the non-inverting input is equal to that at the inverting input, the pull-low differential amplifier 304 is not operated such that the voltage value of the output voltage Vout1 at the output 300*c* is maintained at V1.

Finally, during time t3 to t4, only switches S9 and S10 are turned on and the others are turned off such that the inputs 300*a* and 300*b* can be electrically connected to (short to) the outputs 300*c* and 300*d* respectively. In this period, the level voltages Vin1 and Vin2 at the inputs 300*a* and 300*b* can be directly transmitted to the outputs 300*c* and 300*d* such that the values of the output voltages Vout1 and Vout2 can more precisely change to V1 and VDD respectively, which is referred to as gamma short.

Figure 6C:
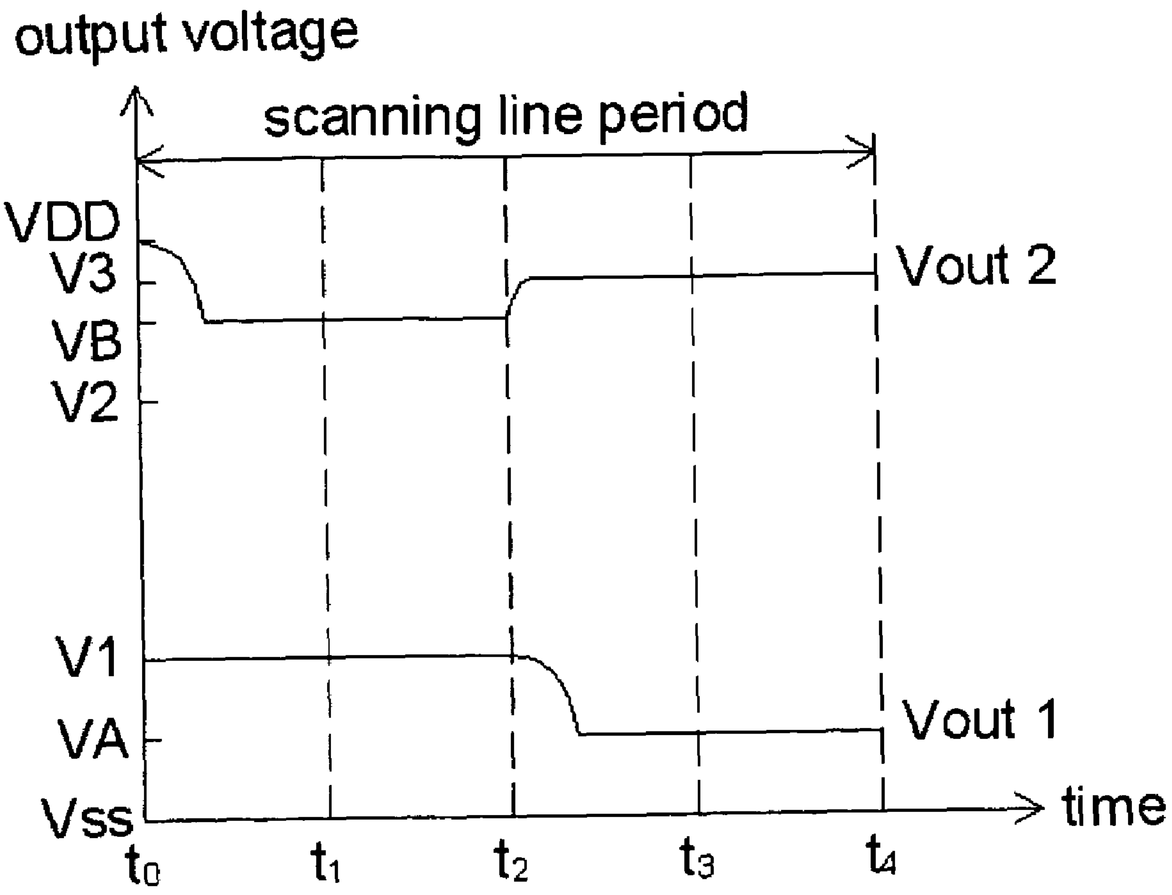

FIGS. 6A and 6C present the other specific example for illustrating how the source driver of FIG. 5 (also referring to FIG. 4) drive the output voltages Vout1, Vout2 to the level voltages Vin1, Vin2 during one scanning time. In this specific example, it is assumed that the level voltages Vin1, Vin2 received by the inputs 300*a*, 300*b* have the voltage values VA and V3 respectively, and the output voltages Vout1, Vout2 at the outputs 300*c*, 300*d* have the voltage values V1 and VDD respectively. FIG. 6C shows the waveforms of the output voltages Vout1, Vout2 during the scanning time from t0 to t4.

Firstly, during time t0 to t1, only switches S11, S12 are turned on. In this period, the data clamping circuit 306 pulls the voltage value of the output voltage Vout2 at output 300*d* from VDD to VB; in addition, the voltage value of the output voltage Vout1 is maintained at V1 since it has been fallen within the range between VA and VB.

Then, during time t1 to t2, only switches S1, S3, S5, S7 are turned on. In this period, the data clamping circuit 306 is disable from clamping the voltage voltages Vout1, Vout2; the transistor NH3 of the pull-high differential amplifier 302 has its gate (non-inverting input) receive the level voltage Vin1 having the value VA from the input 300*a*, and the transistor NH4 has its gate (inverting input) receive the output voltage Vout1 having the value V1 from the output 300*c*. For the pull-high differential amplifier 302, since the voltage value VA at the non-inverting input is smaller than the voltage value V1 at the inverting input, the pull-high differential amplifier 302 is not operated such that the voltage value of the output voltage Vout1 at the output 300*c* is maintained at V1. Meanwhile, the transistor PL3 of the pull-low differential amplifier 304 has its gate (non-inverting input) receive the level voltage Vin2 having the value V3 from the input 300*b*, and the transistor PL4 has its gate (inverting input) receive the output voltage Vout2 having the value VB from the output 300*d*. For the pull-low differential amplifier 304, since the voltage value V3 at the non-inverting input is larger than the voltage value VB at the inverting input, the pull-low differential amplifier 304 is not operated such that the voltage value of the output voltage Vout2 at the output 300*d* is maintained at VB.

Then, during time t2 to t3, only switches S2, S4, S6, S8 are turned on. In this period, the transistor NH3 of the pull-high differential amplifier 302 has its gate (non-inverting input) receive the level voltage Vin2 having the value V3 from the input 300*b* and the transistor NH4 has its gate (inverting input) receive the output voltage Vout2 having the value VB from the output 300*d*. For the pull-high differential amplifier 302, since the voltage value V3 at the non-inverting input is larger than the voltage value VB at the inverting input, the pull-high differential amplifier 302 can increase the output voltage Vout2 of the output 300*d* from the value VB toward V3 through the transistors PH3, PH5. Meanwhile, the transistor PL3 of the pull-low differential amplifier 304 has its gate (non-inverting input) receive the level voltage Vin1 having the value VA from the input 300*a*, and the transistor PL4 has its gate (inverting input) receive the output voltage Vout1 having the value V1 from the output 300*c*. For the pull-low differential amplifier 304, since the voltage value at the non-inverting input is smaller to that at the inverting input, the pull-low differential amplifier 304 can decrease the output voltage Vout1 of the output 300*c* from the value V1 toward VA through the transistors NL3, NL4.

Finally, during time t3 to t4, only switches S9 and S10 are turned on such that the inputs 300*a* and 300*b* can be electrically connected to (short to) the outputs 300*c* and 300*d* respectively. In this period, the level voltages Vin1 and Vin2 at the inputs 300*a* and 300*b* can be directly transmitted to the outputs 300*c* and 300*d* such that the values of the output voltages Vout1 and Vout2 can more precisely change to VA and V3 respectively.

According to the source driver of the present invention, since the voltage range from VB to VDD and the voltage range from VA to VSS provides an enough voltage difference respectively, it becomes easily to drive the output voltage to the voltage level VDD or VSS; therefore, the driving voltage range is not limited as compared to that in prior art.

Figure 7:
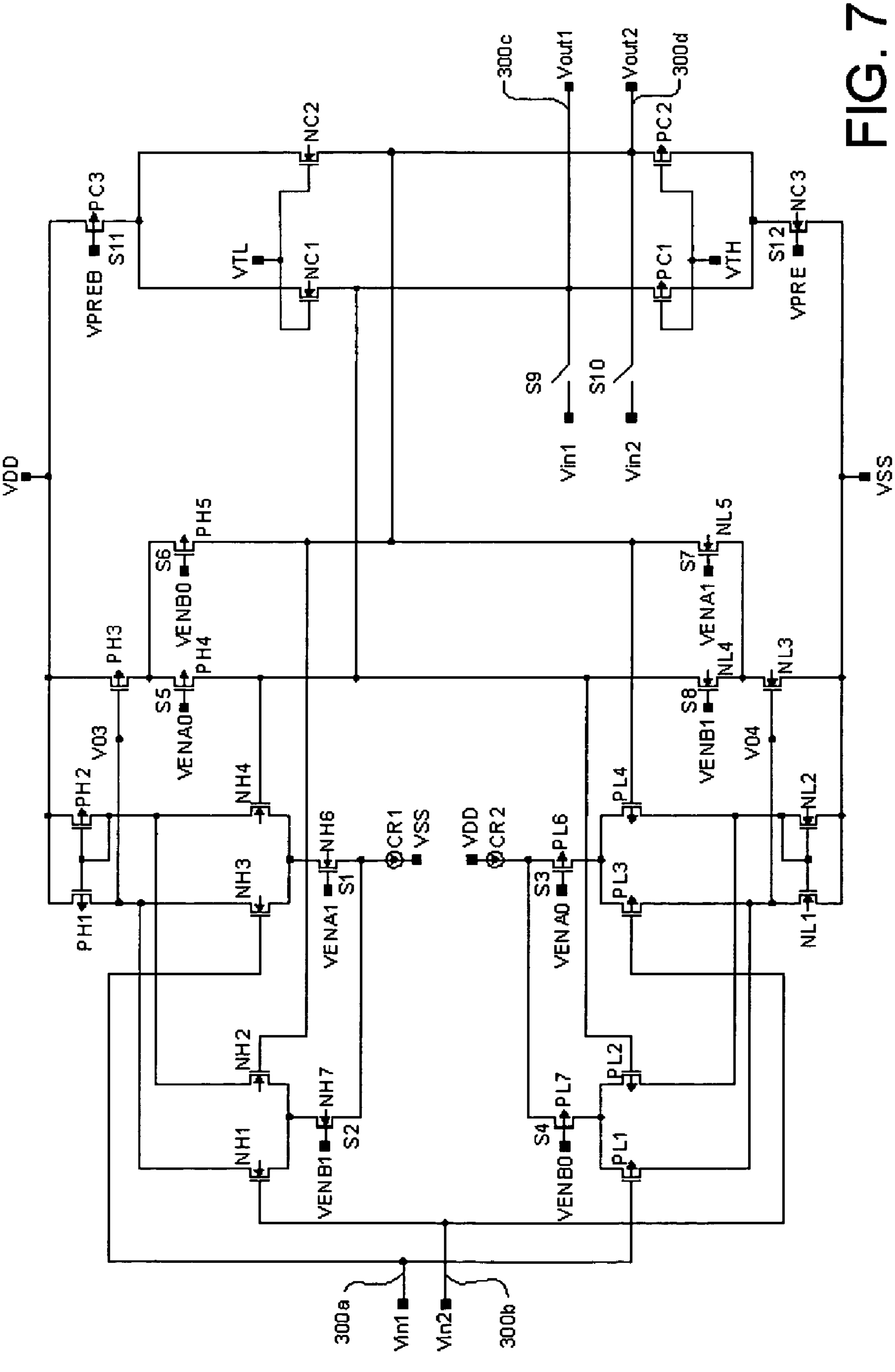
FIG. 7 is a detailed circuit of a source driver for LCDs according to an alternative embodiment of the present invention.

FIG. 7 is an alternative embodiment according to the source driver as shown in FIG. 5, wherein the same elements in FIG. 7 are designated with the same numerals and reference characters in FIG. 5 and will not be further described below. As compared with the source driver of FIG. 5, the source driver of FIG. 7 further comprises a differential pair of NMOS transistors NH1 and NH2 and a differential pair of PMOS transistors PL1 and PL2; in addition, the switches S1, S2 are respectively replaced by NMOS transistors NH6, NH7 and the switches S3, S4 are respectively replaced by PMOS transistors PL6, PL7.

The transistors NH1, NH2 have their drains respectively and electrically connected to the drains of the transistors PH1, PH2 and their sources commonly and electrically connected to the drain of the transistor NH7. The transistors NH2, NH4 have their gates respectively and electrically connected to the drains of the transistors PH5, PH4. The transistors NH3, NH4 have their sources commonly and electrically connected to the drain of the transistor NH6. The transistors NH6, NH7 have their sources electrically connected to one end of the constant current source CR1, and the other end of the constant current source CR1 is electrically connected to the low supply voltage VSS. Further, the transistors NH6, NH7 have their gates respectively and electrically connected to the controlling signals VENA1 and VENB1. The controlling signals VENA1 and VENB1 are used for selectively enabling or disenabling the pull-high differential amplifier 302 and the pull-low differential amplifier 304.

The transistors PL1, PL2 have their drains respectively and electrically connected to the drains of the transistors NL1, NL2 and their sources commonly and electrically connected to the drain of the transistor PL7. The transistors PL2, PL4 have their gates respectively and electrically connected to the drains of the transistors PL4, PL5. The transistors PL3, PL4 have their sources commonly and electrically connected to the drain of the transistor PL6. The transistors PL6, PL7 have their sources electrically connected to one end of the constant current source CR2, and the other end of the constant current source CR2 is electrically connected to the high supply voltage VDD. Further, the transistors PL6, PL7 have their gates respectively and electrically connected to the controlling signals VENA0 and VENB0. The controlling signals VENA0 and VENB0 are used for selectively enabling or disenabling the pull-high differential amplifier 302 and the pull-low differential amplifier 304.

The transistors NH1 and PL3 have their gates commonly and electrically connected to the input 300*a* for receiving the level voltage Vin1, and the transistors NH3 and PL1 have their gates commonly and electrically connected to the input 300*b* for receiving the level voltage Vin2.

The operation of the source driver in FIG. 7 is similar to that in FIG. 5 and will not be further described below.

Figure 8:
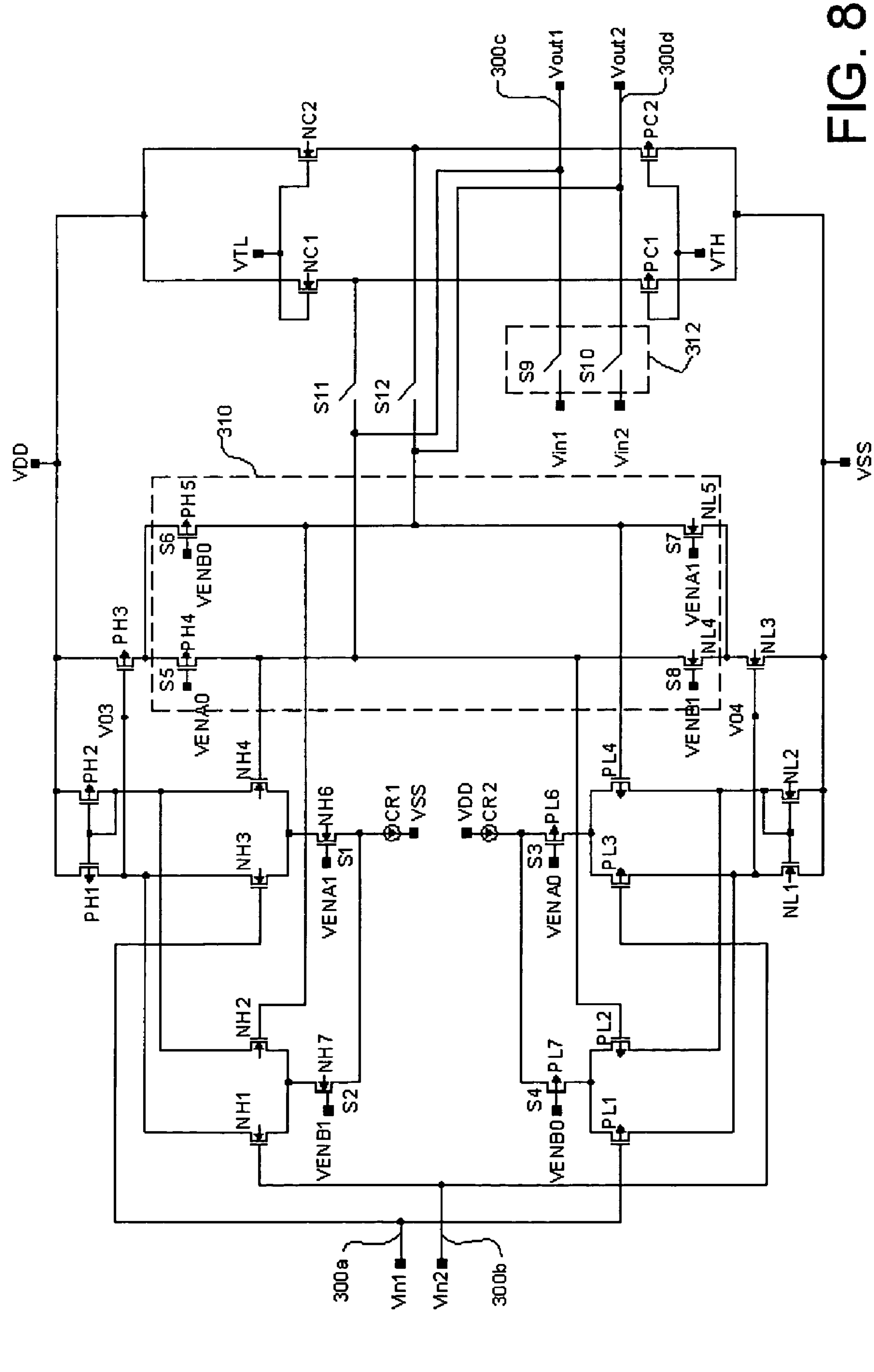
FIG. 8 is a detailed circuit of a source driver for LCDs according to an alternative embodiment of the present invention.

FIG. 8 is an alternative embodiment according to the source driver as shown in FIG. 7, wherein the same elements in FIG. 8 are designated with the same numerals and reference characters in FIG. 7 and will not be further described below. As compared with the source driver of FIG. 7, the source driver of FIG. 8 comprises switches S11, S12 to replace the transistors PC3, NC3 of FIG. 7. In addition, the switch S11 is used for electrically connecting the drain of the transistor PH4 with the source of the transistor NC1, and the switch S12 is used for electrically connecting the drain of the transistor PH5 with the source of the transistor NC2. Further, the transistors NC1, NC2 have their drains electrically connected to the high supply voltage VDD, and the transistors PC1, PC2 have their drains electrically connected to the low supply voltage VSS.

The operation of the source driver in FIG. 8 is similar to that in FIG. 7 and will not be further described below.

As illustrated above, the driving voltage range of the source driver 300 according to the present invention would not be limited as that of the conventional driver and can be increased whereby solving the problem existing in the prior art.

Further, since a plurality of data lines can share the pull-high differential amplifier 302 and the pull-low differential amplifier 304, the circuit size and the manufacturing cost of a source driving circuit can be reduced.

In the above-mentioned embodiment of the present invention, the source driver 300 has two inputs 300*a*, 300*b* and two outputs 300*c*, 300*d* for driving two data lines. However, it should be understood that the source driver 300 could only have one input and one output for driving one data line. In addition, if one scanning line period is long enough, the source driver 300 according to the present invention could have more than two inputs and outputs for driving multiple data lines by controlling the switching circuits.

Although the invention has been explained in relation to its preferred embodiment, it is not used to limit the invention. It is to be understood that many other possible modifications and variations can be made by those skilled in the art without departing from the spirit and scope of the invention as hereinafter claimed.

What is claimed is:

1. A source driver for LCD devices, used for driving at least one data line, comprising:

at least one driving input for receiving a predetermined voltage level;

at least one driving output being electrically connected to the data line and having a first output voltage level;

a voltage clamping circuit for clamping the first output voltage level within a range between a first voltage level and a second voltage level, wherein the second voltage level is larger than the first voltage level;

a first differential amplifier having two first inputs and a first output, the two first inputs respectively used for receiving the predetermined voltage level from the driving input and the clamped first output voltage level from the driving output, wherein the first differential amplifier is electrically connected to the driving output through the first output for increasing the clamped first output voltage level at the driving output toward the predetermined voltage level while the predetermined voltage level is larger than the clamped first output voltage level; and a second differential amplifier having two second inputs and a second output, the two second inputs respectively used for receiving the predetermined voltage level from the driving input and the clamped first output voltage level from the driving output, wherein the second differential amplifier is electrically connected to the driving output through the second output for decreasing the clamped first output voltage level at the driving output toward the predetermined voltage level while the predetermined voltage level is smaller than the clamped first output voltage level.

2. The source driver for LCD devices as claimed in claim 1, wherein the first differential amplifier is coupled to a high supply voltage, and the voltage level of the high supply voltage is larger than the first voltage level and the second voltage level.

3. The source driver for LCD devices as claimed in claim 1, wherein the driving input, the driving output and the data line are respectively plural and each driving output is respectively and electrically connected to each data line.

4. The source driver for LCD devices as claimed in claim 3, further comprising a first switching circuit for alternatively and electrically switching each predetermined voltage level received by each driving input to one of the two first inputs and one of the two second inputs, such that the first and second differential amplifiers alternatively receive the predetermined voltage level from each driving input.

5. The source driver for LCD devices as claimed in claim 3, further comprising a second switching circuit for alternatively and electrically switching the first output and the second output of the first and second differential amplifiers to each driving output, such that the first output and the second output are alternatively and electrically connected to each driving output.

6. The source driver for LCD devices as claimed in claim 1, further comprising a third switching circuit for electrically connecting the voltage clamping circuit to the driving output thereby clamping the first output voltage level within the range between the first voltage level and the second voltage level.

7. The source driver for LCD devices as claimed in claim 1, further comprising a fourth switching circuit for electrically connecting the at least one driving input to the at least one driving output such that the first output voltage level at the driving output is substantially equal to the predetermined voltage level received by the driving input.

8. A source driving method for LCD devices, applied to a source driver, for driving a data line having a first output voltage level, wherein the source driver includes a first differential amplifier having two inputs and one output for increasing the first output voltage level and a second differential amplifier having two inputs and one output for decreasing the first voltage level, the source driving method comprising following steps:

clamping the first output voltage level within a range between a first voltage level and a second voltage level, wherein the second voltage level is larger than the first voltage level; and receiving the clamped first output voltage level and a predetermined voltage level at the two inputs of one of the first differential amplifier and the second differential amplifier, and then pulling the clamped first output voltage level of the data line toward the predetermined voltage level according to the output of one of the first differential amplifier and the second differential amplifier.

9. The source driving method for LCD devices as claimed in claim 8, wherein the first differential amplifier is coupled to a high supply voltage, and the voltage level of the high supply voltage is larger than the first voltage level and the second voltage level.

10. The source driving method for LCD devices as claimed in claim 8, wherein the step of pulling the first output voltage level of the data line toward the predetermined voltage level further comprises following steps:

increasing the first output voltage level toward the predetermined voltage level through the first differential amplifier if the first output voltage level is smaller than the predetermined voltage level; and decreasing the first output voltage level toward the predetermined voltage level through the second differential amplifier if the first output voltage level is larger than the predetermined voltage level.

11. The source driving method for LCD devices as claimed in claim 8, further comprising a following step after the pulling step:

connecting the predetermined voltage level to the data line such that the first output voltage level of the data line is substantially equal to the predetermined voltage level.

12. A source driving method, applied to a source driver, for driving a plurality of data lines each having a first output voltage level, wherein the source driver includes a first differential amplifier having two inputs and one output for increasing the first output voltage level and a second differential amplifier having two inputs and one output for decreasing the first output voltage level, the source driving method comprising following steps:

clamping the first output voltage level of each data line within a range between a first voltage level and a second voltage level, wherein the second voltage level is larger than the first voltage level; and within a predetermined period, alternatively receiving the first output voltage levels of the data lines and a plurality of predetermined voltage levels through the inputs of the first differential amplifier and the second differential amplifier, and respectively pulling the clamped first output voltage level of each data line toward each predetermined voltage level according to the outputs of the first differential amplifier and the second differential amplifier.

13. The source driving method as claimed in claim 12, wherein the first differential amplifier is coupled to a high supply voltage, and the voltage level of the high supply voltage is larger than the first voltage level and the second voltage level.

14. The source driving method as claimed in claim 12, wherein the predetermined period is a scanning line period.

15. The source driving method as claimed in claim 12, wherein the step of respectively pulling the first output voltage level of each data line toward each predetermined voltage level further comprises following steps:

increasing the first output voltage level toward the predetermined voltage level through the first differential amplifier if the first output voltage level is smaller than the predetermined voltage level; and decreasing the first output voltage level toward the predetermined voltage level through the second differential amplifier if the first output voltage level is larger than the predetermined voltage level.

16. The source driving method as claimed in claim 12, further comprising following step after the pulling step:

respectively connecting each predetermined voltage level to each data line such that the first output voltage level of each data line is substantially equal to each predetermined voltage level respectively.

17. A driving device comprising:

a first driving output having a first output signal;

a first driving input for receiving a first input voltage;

a voltage clamping circuit for clamping the voltage level of the first output signal at a first time period for outputting a first clamped voltage level from a first clamp output of the voltage clamping circuit;

a pull-high circuit having a first input node connected to the first driving input and a second input node connected to the first clamp output of the voltage clamping circuit, for pulling high the voltage level at the second input node if the voltage level at the first input node is greater than the voltage at the second input node after the first time period; and a pull-low circuit having a third input node connected to the first driving input and a fourth input node connected to the first clamp output of the voltage clamping circuit, for pulling low the voltage level at the fourth input node if the voltage level at the third input node is lesser than the voltage level at the fourth input node after the first time period.

18. The driving device as claimed in claim 17, wherein the pull-high circuit and the pull-low circuit are powered by a high supply voltage, the voltage clamping circuit clamps the voltage level of the first output signal within a range between a first voltage level and a second voltage level, and the voltage level of the high supply voltage is larger than the first voltage level and the second voltage level.

19. The driving device as claimed in claim 17, further comprising:

a second driving output having a second output signal, wherein the voltage clamping circuit further clamps the voltage level of the second output signal at a first time period for outputting a second clamped voltage level from second clamp output of the voltage clamping circuit;

a second driving input for receiving a second input voltage;

a first switching circuit for switching the first driving input and the second driving input to the first input node of the pull-high circuit and the third input node of the pull-low circuit; and a second switching circuit for switching the first clamp output and the second clamp output to the second input node of the pull-high circuit and the fourth input node of the pull-low circuit.

20. The driving device as claimed in claim 19, further comprising a third switching circuit for connecting the first driving input to the first driving output and connecting the second driving input to the second driving output after the pull-high circuit and the pull-low circuit finished operation.

21. The driving device as claimed in claim 17, wherein the first voltage clamping circuit comprises a first switching circuit for selectively enabling the first voltage clamping circuit at the first time period.

22. The driving device as claimed in claim 17, which is applied to an LCD device.

23. A driving method for driving a data line from a first voltage level toward a predetermined voltage level, comprising following steps:

receiving the predetermined voltage level;

clamping the first output voltage level within a range;

pulling high the data line towards the predetermined voltage level if the predetermined voltage level is larger than the clamped first voltage level; and pulling low the data line towards the predetermined voltage level if the predetermined voltage level is lesser than the clamped first voltage level.

24. The driving method as claimed in claim 23, wherein the clamping step is performed at a first time period, the pulling high and pulling low steps are performed afterwards.

25. The driving method as claimed in claim 23, further comprising a step of directly connecting the predetermined voltage level to the data line after the pulling low step.

* * * * *